United States Patent Office 2,799,595
Patented July 16, 1957

2,799,595

PREPARATION OF PHTHALOCYANINE PIGMENTS

Stanley F. Kudzin, Leonia, N. J., assignor to E. I. du Pont de Nemours and Company, Wilmington, Del., a corporation of Delaware No Drawing. Application November 12, 1953, Serial No. 391,741

3 Claims. (Cl. 106—288)

This invention relates to the preparation of phthalocyanine pigments and more particularly it relates to the production and finishing of phthalocyanine pigments which are resistant to flocculation when dispersed in an organic coating composition.

Phthalocyanine pigments are well known for their outstanding tinctorial strength and resistance to light and chemical agents. Such pigments are also known to have a serious defect commonly referred to as flocculation, a characteristic evidenced by an apparent aggregation of pigment particles during setting and drying of organic coating compositions containing the same, resulting in marked reduction of color strength. What actually happens in the paint film and whether the word "flocculation" is correctly used to described it are subjects which have been disputed. The important point, however, is that the enamel, paint or lacquer when standing in a quiescent state exhibits a different color than when it is being vigorously agitated and, therefore, can not be depended upon to give reproducible color in actual use under a variety of conditions of application.

The reversibility of the phenomenon may, moreover, be used as a test for "flocculation." One may, for instance, make a typical enamel containing about 10 parts of phthalocyanine and 90 parts of $TiO_2$ dispersed in an oil-modified alkyd resin and this enamel may be applied to a test panel by spraying in the conventional manner. When the film has become tacky, usually in three to five minutes, a portion of the panel is rubbed with a soft cloth or with the finger. A difference in color of the rubbed portion as compared to the undisturbed film is considered evidence of flocculation. With untreated prior art phthalocyanines this rubbed portion of the film appears darker or stronger than the unrubbed portion. This test might be considered typical of the behavior of a brushing enamel which shows serious brush marks when a partially dried portion is brushed over as in joining with a previously brushed portion.

Another test more particularly applicable to compositions which dry very rapidly and largely by evaporation of the solvent, such as a typical nitrocellulose lacquer, but also applicable to enamels especially those formulated for application by dipping, involves spraying a test panel and allowing it to dry, after which a portion of the same composition which has been standing undisturbed is poured over the test panel and allowed to drain freely. Again, a difference in color is evidence of "flocculation" and with the typical prior art phthalocyanine the poured portion appears light or weak vs. the sprayed portion. This test illustrates the problem encountered in attempting to match the color of a dipped auto fender, for instance, with that of the sprayed auto body.

Numerous attempts have been made to eliminate the defect of flocculation of phthalocyanine pigments for example, the addition of aluminum benzoate or phthalocyanine monosulfonic acid to the phthalocyanine pigments subject to flocculation.

It is well known that pure copper phthalocyanine pigments exhibit a pronounced tendency to grow crystals in many hydrocarbon solvents, particularly those of an aromatic nature, with consequent loss of tinctorial strength. To obviate this defect, it is also well known to introduce small amounts of chlorine, usually about 3%–5%, which is appreciably less than one atom of chlorine per molecule of phthalocyanine. Such chlorine-containing pigments are not significantly altered in shade and are substantially free from the tendency to grow crystals in solvents. Chlorine is also sometimes introduced in larger amounts to alter the hue toward green. Throughout the specification and claims reference to copper phthalocyanine is intended to include chlorine-containing copper phthalocyanine.

In the copending application of Felix F. Ehrich, Serial No. 391,729, filed November 12, 1953, new and improved phthalocyanine pigments that are remarkably resistant to flocculation are described and claimed. These new pigments are prepared through the use, in the well-known phthalic anhydride-urea synthesis of mixtures of a minor amount of 4-sulfophthalic anhydride or 4-sulfophthalic acid under such conditions that about 2–15% of the molecules of the phthalocyanine can contain the polar sulfonic group. In accordance with one embodiment of the invention of Felix F. Ehrich, 1.25 mol percent to 2.5 mol percent of 4-sulfophthalic acid or 4-sulfophthalic anhydride is added to 97.5 to 98.75 mol percent of phthalic anhydride and the mixture used with appropriate amounts of urea, cupric chloride, and, as a catalyst, ammonium molybdate in a conventional phthalocyanine synthesis conducted in a diluent medium such as kerosene.

U. S. Patent No. 2,556,727, issued to Lane and Stratton describes and claims an improved process for the grinding of hard-to-grind phthalocyanine pigments by ball-milling with grinding elements not greater than 0.25 inch in diameter in an organic liquid such as aromatic and aliphatic hydrocarbons and oxygenated compounds such as acetone, methanol, methyl acetate and the like.

It has been found that this excellent pigment does not yield readily to the previously-known methods of subdivision of the pigmentary material to obtain a pigment of very fine particle size exhibiting high tinctorial strength and brilliant shade.

It is an object of this invention to provide an improved process for the sub-division of phthalocyanine pigments containing a minor amount of phthalocyanine 4-monosulfonic acid.

Other objects of the invention will appear hereinafter.

The objects of this invention may be achieved by grinding the phthalocyanine pigments containing a minor amount of 4-sulfophthalic acid or 4-sulfophthalic anhydride in a ball mill containing ball-grinding elements not greater than 0.25 inch in diameter, the pigment being suspended during the milling operation in a chlorinated hydrocarbon, removing the chlorinated hydrocarbon, and isolating a superior dry pigment having a desirable soft texture.

Preferably the grinding elements will have a size between 0.1 inch and 0.25 inch in diameter and the chlorinated hydrocarbon will be present in an amount between 5 and 10 parts by weight for each part by weight of the pigment.

The following examples illustrate, in detail, several procedures for the production of the improved phthalocyanine pigments obtainable by the process of this invention.

Example 1

The following ingredients are charged to a well agitated reactor equipped with an air-cooled reflux condenser and arranged for external heating:

| | | |
|---|---|---|
| Pthalic anhydride | grams | 121 |
| 4-chloro phthalic acid | do | 34 |
| 4-sulfo phthalic acid | do | 3.1 |
| Cupric chloride dihydrate | do | 44 |
| Urea | do | 222 |
| Ammonium molybdate | do | 0.3 |
| Deodorized kerosene | ml | 800 |

The mixture is heated with good agitation to 195° C. over a period of two and one-half to three hours and held at 195°–200° C. for about four hours. It is then cooled to 150° C. at which point 90 ml. of 98% $H_2SO_4$ is added dropwise. The resulting solid is filtered from the kerosene and added to 4000 ml. of water containing 200 grams of NaOH. The slurry is heated to the boil, filtered hot, washed free of soluble salts and dried at about 150° C.

The resulting crude copper phthalocyanine pigment, which contains about 5 mol percent of 4-monosulfo copper phthalocyanine and about 65 mol percent of 4-monochloro copper phthalocyanine, is milled by ball-milling as follows:

Sixty-five (65) grams of the coarse pigment and 500 grams of carbon tetrachloride are charged to a ball mill of about 2/3 gallon total capacity containing about 4800 grams of 1/8 inch steel shot and the mill is rotated for about three days. The slurry of pigment is separated from the steel shot and the carbon tetrachloride is removed by steam distillation accompanied by vigorous agitation. The resulting aqueous slurry is then boiled with a 4% aqueous solution of $H_2SO_4$, filtered, washed free of soluble salts, dried, and pulverized to yield a copper phthalocyanine pigment of uniform quality, free from grit, which exhibits excellent dispersion in coating composition vehicles, and which is highly resistant to flocculation.

The quality of this pigment, ground in carbon tetrachloride, is noticeably superior in quality and texture to a similar pigment ground in like manner in acetone, methyl alcohol, or xylene. To illustrate the nature of the superiority of the quality and texture of the pigment of this example, reference is made to the well-known multiple roller mill dispersion of pigments in vehicles. With such a mill, a pigment which is poor in dispersion may show a deficiency in any one or more of three characteristics which are readily observed and which materially affect the economic use of the product. The first is a tendency for the pigment and vehicle to separate on the mill so that the vehicle tends to pass through the mill first and leave a relatively dry pigment toward the end of the cycle. This makes for non-uniformity requiring additional mixing and also causes unusual stresses in the mill. The second criterion of good dispersion is freedom from grit or unground pigment which can cause streaking or other defects in the final film. The third characteristic is the rate of development of color strength on successive passes over the mill. On all three characteristics, the pigment of this Example I shows excellent properties.

Example II

This is like Example I except for an increase in the 4-sulfo phthalic acid to give a product containing about 10 mol percent of 4-mono sulfo copper phthalocyanine, 64 mol percent 4-mono chloro copper phthalocyanine, and 26 mol percent of unsubstituted copper phthalocyanine.

The following ingredients were used in the basic process of Example I:

| | | |
|---|---|---|
| Pthalic anhydride | grams | 121 |
| 4-chlor phthalic acid | do | 32 |
| 4-sulfo phthalic acid | do | 6.2 |
| Cupric chloride dihydrate | do | 44 |
| Urea | do | 222 |
| Ammonium molybdate | do | 0.3 |
| Deodorized kerosene | ml | 800 |

The coarse pigment is then milled in accordance with the process described in Example I using trichlorethylene as the chlorinated hydrocarbon. The resultant pigment is of the same high quality as that produced in Example I.

Instead of using carbon tetrachloride or trichlorethylene, other liquid chlorinated hydrocarbons, e. g., tetrachlorethylene, ortho-dichlorbenzene, and the like, can be used to produce the excellent results of the above-described examples. The reason for the superior action of chlorinated hydrocarbons in the ball-milling operation is not known but the results produced thereby are very evident in the superior quality and texture of the pigment. These superior results obtained by the use of chlorinated hydrocarbons are peculiarly obtained only with chlorine-containing phthalocyanine pigments, but is considered to be applicable also, with equally desirable results, to other metal chlorine-containing phthalocyanine pigments containing a minor amount of 4-sulfophthalic acid or anhydride such as nickel, cobalt, aluminum, and iron phthalocyanines and metal-free phthalocyanines.

Throughout the specification and claims, any reference to parts, proportions and percentages refers to parts, proportions and percentages by weight unless otherwise specified.

Since it is obvious that many changes and modifications can be made in the above-described details without departing from the nature and spirit of the invention, it is to be understood that the invention is not to be limited to said details except as set forth in the appended claims.

I claim:

1. The process of sub-division of a chlorine-containing phthalocyanine pigment containing 2 to 15 mol percent of a cosynthesized phthalocyanine 4-mono-sulfonic acid with comprises ball-milling the pigment suspended in 5 parts to 10 parts by weight of a chlorinated hydrocarbon for each part by weight of the pigment with grinding elements not greater than 0.25 inch in diameter, removing said chlorinated hydrocarbon by steam distillation after completion of the ball milling step, and then drying the pigment.

2. The process of sub-division of a chlorine-containing phthalocyanine pigment containing 2 to 15 mol percent of a cosynthesized phthalocyanine 4-mono-sulfonic acid which comprises ball-milling the pigment suspended in 5 parts to 10 parts by weight of carbon tetrachloride for each part by weight of the pigment with grinding elements not greater than 0.25 inch in diameter, removing said chlorinated hydrocarbon by steam distillation after completion of the ball milling step, and then drying the pigment.

3. The process of claim 1 in which the phthalocyanine pigment and the phthalocyanine 4-mono-sulfonic acid are respectively copper phthalocyanine pigment and copper phthalocyanine 4-mono-sulfonic acid.

References Cited in the file of this patent

UNITED STATES PATENTS

| | | |
|---|---|---|
| 2,273,597 | Schroder | Feb. 17, 1942 |
| 2,526,345 | Giambalvo | Oct. 17, 1950 |
| 2,556,727 | Lane | June 12, 1951 |
| 2,556,729 | Stallmann | June 12, 1951 |